Feb. 12, 1957  J. A. RUBY ET AL  2,781,079
SEALING APPARATUS
Filed Nov. 17, 1953  4 Sheets-Sheet 1
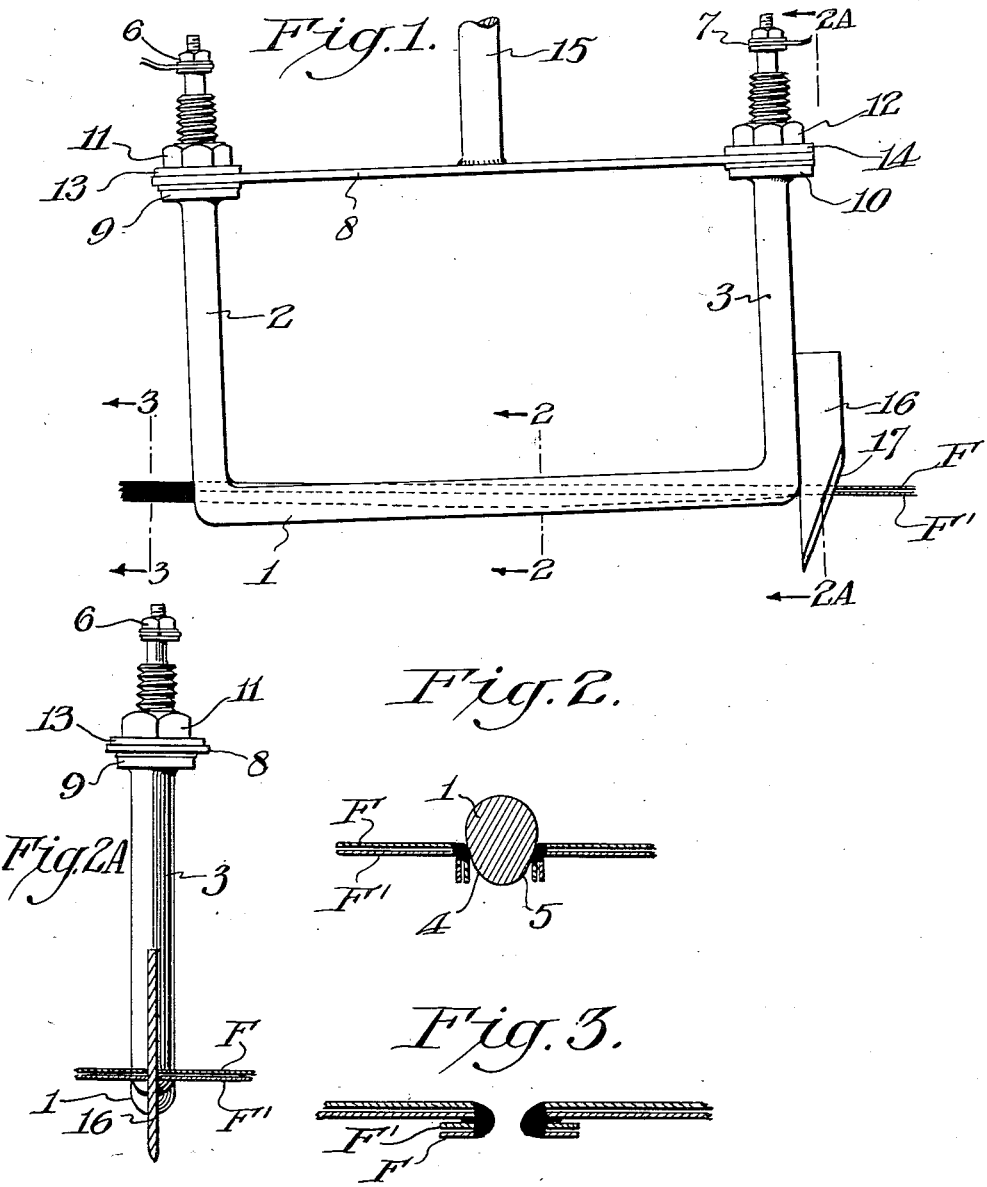
INVENTORS
Arthur Robert Reary
John Atlee Ruby
BY 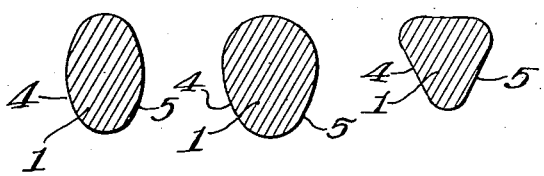
ATTORNEY

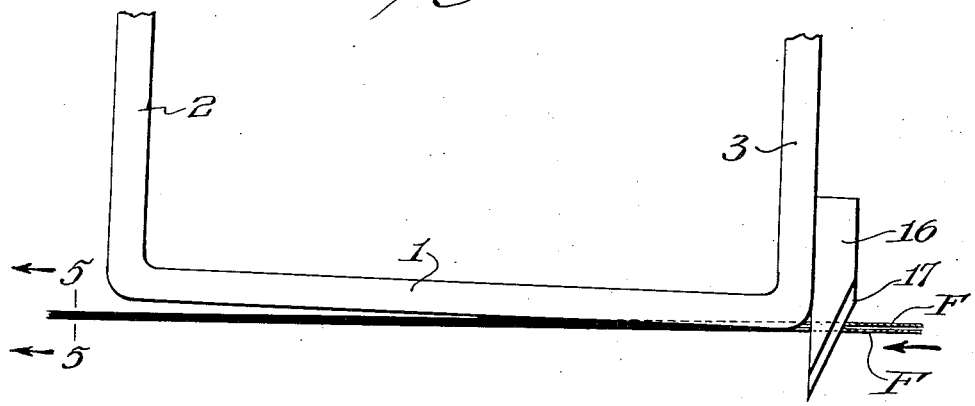
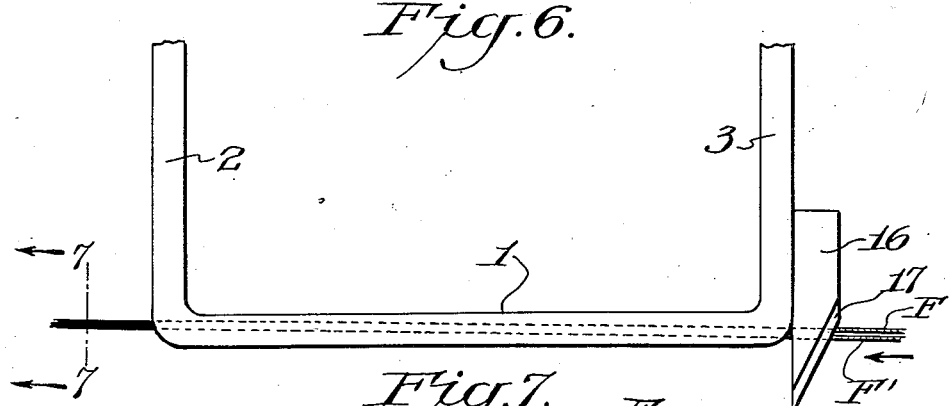

Feb. 12, 1957
J. A. RUBY ET AL
2,781,079
SEALING APPARATUS
Filed Nov. 17, 1953
4 Sheets-Sheet 3
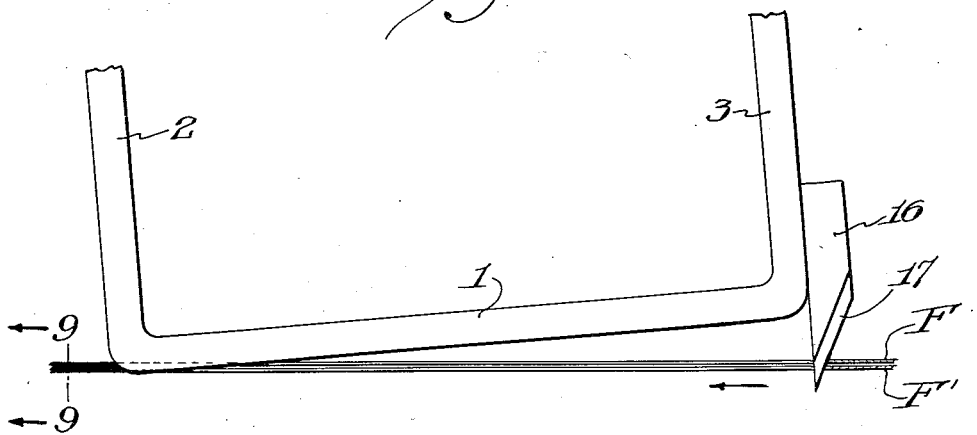
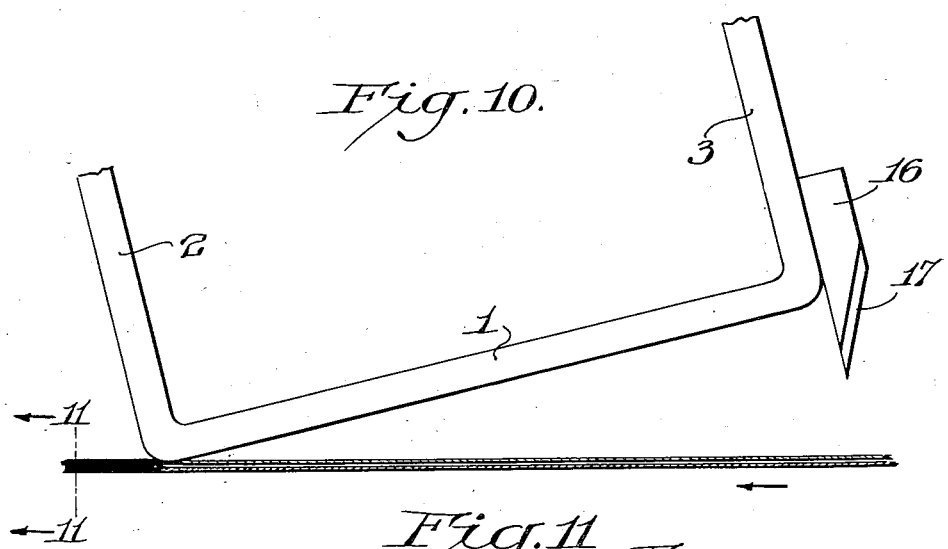
INVENTORS
Arthur Robert Reary
John Atlee Ruby
BY
ATTORNEY

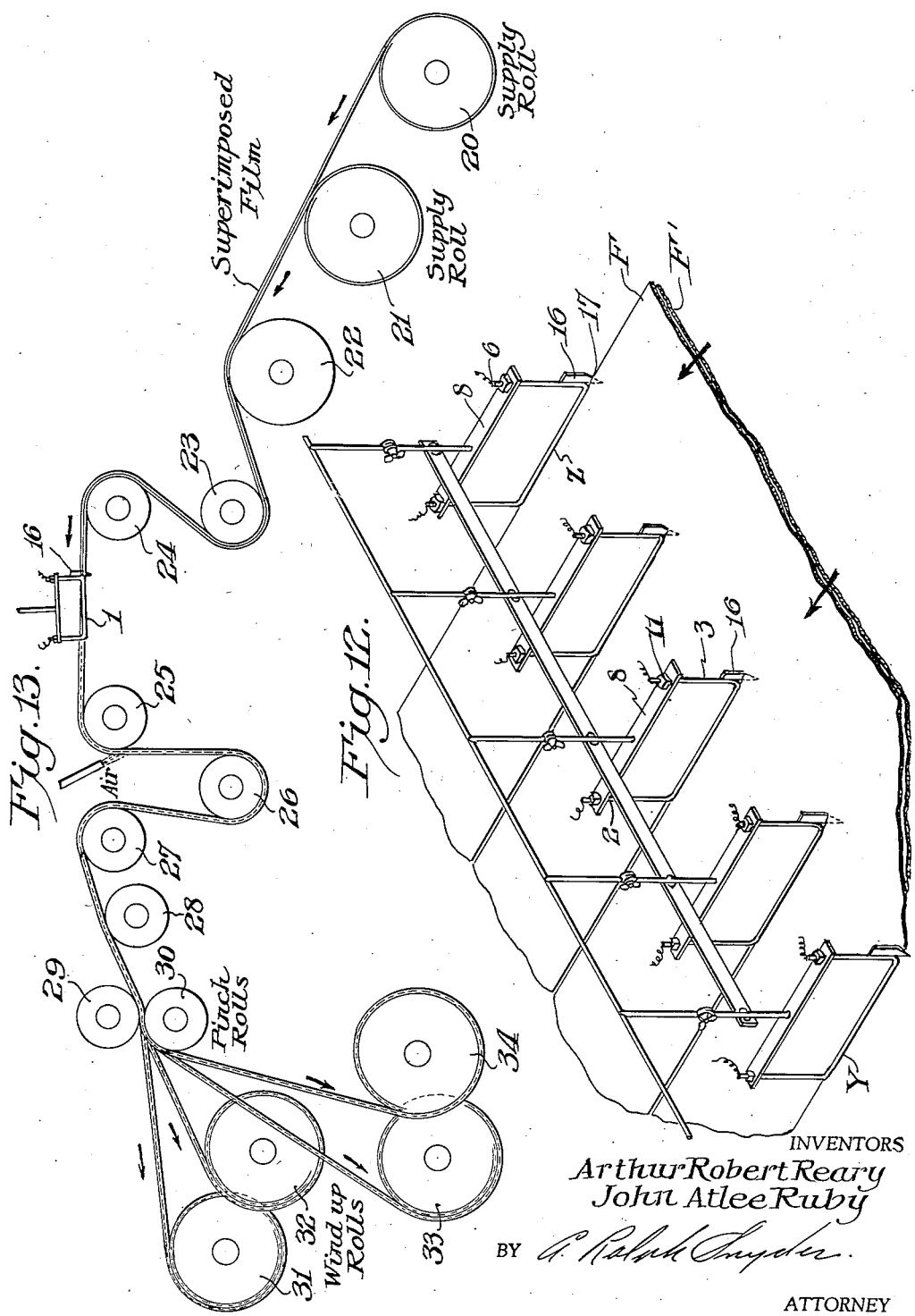

2,781,079
SEALING APPARATUS

John Atlee Ruby, Wilmington, Del., and Arthur Robert Reary, Boyertown, Pa.; said Ruby assignor to E. I. du Pont de Nemours and Company, Wilmington, Del., a corporation of Delaware Application November 17, 1953, Serial No. 392,562

7 Claims. (Cl. 154—42)

This invention relates to an apparatus for heat-sealing thermoplastic films and, more particularly, to an apparatus for simultaneously slitting and sealing continuous lengths of superimposed thermoplastic films, and to an improved form of seal joint.

Continuous lengths of thermoplastic tubing, that is, tubing of polyethylene, polyvinylidene chloride, rubber hydrochloride, polyethylene terephthalate, and other types of thermoplastic polymers, may be fabricated by following a number of well known techniques. For example, seamless thermoplastic tubing in thicknesses ranging anywhere from 1 mil to 10 mils or greater may be directly extruded from a melt of the polymer by employing suitable annular type orifices. On the other hand, continuous lengths of thermoplastic tubing having a single longitudinal seam may be prepared from continuous lengths of thermoplastic film by continuously folding the continuous length of film to overlap the edges, and heat-sealing the overlapped edges together. Tubing having a single seam in the form of a butt weld may be formed by folding a continuous length of film in half along its longitudinal axis, and sealing the edges of the film together to form a butt or bead seal.

Another technique for making a seamed tubing involves superimposing two thermoplastic films and sealing the adjacent edges of the films together using a butt or bead seal. Furthermore, for the purpose of converting relatively wide strips or lengths of thermoplastic films into relatively narrow width tubing, the superimposed lengths of film may be simultaneously slit and sealed to form a multiplicity of lengths of tubing having a double seam. Such lengths of tubing may be used as such, or usually, the tubing is sealed and cut transversely to form individual bags of any desired length. These bags are then employed in a variety of packaging applications depending upon the type of film used to fabricate the bags. Furthermore, such technique of preparing a double seam tubing by sealing the edges of superimposed films together may also be used to form bags having multiple pockets. That is, continuous lengths of tubing having a multiplicity of separated openings may be fabricated by superimposing more than two lengths of thermoplastic films and sealing the multiplicity of adjacent edges together or slitting and sealing the edges of the films together where tubing narrower than the original width of the film is desired. Such tubing may then be converted into bags having multiple pockets by sealing and slitting the tubing transversely.

The general technique of sealing or slitting and sealing superimposed thermoplastic films together has not heretofore been generally practiced because no efficient apparatus has been available to produce continuous edge seals which are substantially faultless. In the past, continuous lengths of thermoplastic films have been simultaneously slit and sealed by means of rotating hot discs, the edges of the discs rotating in the grooves of a rotating roll positioned parallel to the axis of the discs. On the other hand, hot knife edges or razor blades heated to elevated temperatures have been employed to accomplish the same purpose. However, in general, such apparatus have failed to produce continuous longitudinal edge seals of flawless quality, the term "flawless" meaning that the longitudinal seal is free of areas of weak seal strength or areas of substantially no seal. The presence of such flaws in a longitudinal edge seal leads to eventual failure of the entire seal because at the point of weak or no seal, tearing will begin to occur when pressure is exerted against the edge seal. Such pressure is exerted, for example, by the weight of the article or articles packaged in the bag fabricated from single or double seam tubing.

It should be pointed out that the main reason for the formation of flaws in continuous edge seals made with apparatus employed heretofore is that uniform contact between the hot sealing element is not maintained during the sealing operation. Furthermore, the dwell or time of contact between the edges of the film and the hot sealing elements, that is, in apparatus designed to slit and seal superimposed film simultaneously, has not been sufficient to produce a flawless seal, particularly when operating at commercially feasible sealing rates.

An object of the present invention is to provide a heat-sealing apparatus for sealing adjacent edges of superimposed thermoplastic films together in a continuous manner. A further object is to provide an apparatus for simultaneously slitting and sealing superimposed thermoplastic films together in a continuous fashion to form continuous lengths of thermoplastic tubing. A still further object is to provide a heat-sealing apparatus capable of forming a variety of types of longitudinal edge seals. An adidtional object is to provide a new and improved type of seal joint, i. e., the seal betwen adjoining edges of thermoplastic webs. Other objects will be apparent from the description of the invention to follow.

These objects are realized by the present invention which, briefly stated, comprises a sealing bar comprising an elongated, substantially straight, horizontal, bottom portion and an upwardly extending arm at each end thereof, said bar being so formed in cross-section as to present two oppositely disposed heat-sealing surfaces, the surfaces meeting in a line below and parallel to the longitudinal axis of said bar and on the vertical axis thereof, means for heating said bar, and preferably, web-cutting means in advance of said heat-sealing surfaces.

More specifically, the heat-sealing apparatus comprises an electrically heated sealing bar having a substantially oval or egg-shaped cross-section, said bar being positioned so that the bottom portion thereof is substantially within the plane of the films being sealed, the widest portion of the cross-section being uppermost, and having attached to its leading edge, that is, a vertical arm of the bar, a cutting blade having at least its leading edge sharpened to facilitate slitting continuous lengths of thermoplastic films.

Although it is possible to slit superimposed films with cutting means positioned ahead, i. e., cutting means not attached to the sealing bar, it is preferred that the cutting means, e. g., a knife blade, be directly attached to, or formed from (i. e., by suitably shaping or sharpening an arm of the bar) the leading edge of the sealing bar. When directly attached to the sealing element, the knife blade is heated by conduction to a temperature approaching that of the sealing element itself. Heating the knife blade serves to slit and seal the superimposed lengths of film together before the final wider and stronger seal, i. e., stronger by virtue of uniformity and depth of seal, is made when the tacked edges of the film come into contact with the sealing bar. This initial tacking of the superimposed films serves to maintain the superimposed films in uniform contact and alignment and, hence, facilitates the function of the sealing element in making uniform longitudinal seals. In general, it should be emphasized that slitting superimposed films with a knife edge attached directly to or formed from the sealing element provides for adequate control over the continuously moving superimposed webs, e. g., films, fabrics, etc., that is, control from the standpoint of tracking and maintaining uniform tension, i. e., uniform contact, between the superimposed webs.

The apparatus of this invention, in preferred embodiments thereof, will hereinafter be described with reference to the accompanying drawings wherein:

Figure 1 is a side view of an embodiment of the present invention showing the position of the apparatus with respect to two superimposed lengths of thermoplastic films;

Figure 2 is a section 2—2 of Figure 1, showing a cross-sectional view of the sealing bar and the positions of the edges of the superimposed films as they are being sealed and lapped;

Figure 2A is section 2A—2A of Figure 1 showing the cross-sectional configuration of the cutting means mounted upon the leading edge of the sealing bar;

Figure 3 is section 3—3 of Figure 1 illustrating the cross-sectional view of the improved type of seal, hereinafter termed a "lap" seal, produced in the superimposed films after passing through the apparatus of Figure 1;

Figure 4 is a side view of the embodiment of the present invention shown in Figure 1 but in a different position than in Figure 1;

Figure 5 is section 5—5 of Figure 4 showing a cross-sectional view of the type of seal effected at the edges of superimposed films passed through the present apparatus positioned as shown in Figure 4;

Figure 6 is the embodiment of the present apparatus shown in Figures 1 and 4 but in a different position with respect to the plane of the superimposed films;

Figure 7 is section 7—7 of Figure 6 showing a cross-sectional view of the edge-sealed superimposed films after passing through the present apparatus in the position shown in Figure 6;

Figure 8 is the embodiment of the present invention shown in Figures 1, 4 and 6 except that it is positioned differently therefrom with respect to the plane of the superimposed films;

Figure 9, section 9—9 of Figure 8, is a cross-sectional view of the type of seal produced in the superimposed films after passing through the apparatus in the position shown in Figure 8;

Figure 10 is the embodiment of the present invention shown in Figures 1, 4, 6 and 8 except that it is in a different position therefrom with respect to the plane of the superimposed films;

Figure 11 is section 11—11 of Figure 10 showing a cross-sectional view of the seal produced in the superimposed films after passing through the present apparatus in the position illustrated in Figure 10;

Figure 12 is a sketch illustrating the use of a multiplicity of apparatus of the present invention for simultaneously slitting and sealing relatively wide continuous lengths of superimposed thermoplastic films to form a multiplicity of double seam tubing;

Figure 13 illustrates a schematic diagram of an arrangement of supply rolls, tensioning rolls, pinch rolls, and wind-up rolls arranged in relative positions operable for continuously superimposing two continuous lengths of thermoplastic films, conducting the superimposed films through tensioning rolls to maintain proper tension during slitting, and finally conducting the continuous lengths of tubing through tensioning rolls and finally to wind-up apparatus;

Figure 14 is a cross-sectional view of the sealing bar of the present invention wherein the cross-section is elliptical;

Figure 15 is a cross-sectional view of the sealing bar of the present invention wherein the cross-section is substantially oval; and Figure 16 illustrates still another cross-sectional configuration for the sealing bar wherein the cross-sectional configuration is substantially triangular but having rounded corners.

Referring particularly to Figures 1 and 2, a preferred embodiment of the apparatus comprises a sealing bar having an elongated, substantially straight bottom portion 1, and upwardly extending arms 2 and 3, said bar having the substantially elliptical cross-sectional configuration shown in Figure 2, providing sealing surfaces 4 and 5. While the rod may, of course, be of any suitable material and may be heated by any desired means, it is preferred to employ an electrically heated rod of the type customarily used in the surface heating units of electric ranges. Suitable electric terminals 6 and 7 to be connected to a source of power (not shown) are provided at the extremities of arms 2 and 3 respectively; and the unit is strengthened by a cross-bar 8 bridging the gap between the arms; the cross-bar being supported at each end on collars 9 and 10 fixed to the arms and maintained in position by nuts 11 and 12 and associated washers 13 and 14. A rod 15 attached midway of the cross-bar 8 serves as a means for mounting the unit in position. Preferably, a knife blade 16 with its cutting edge 17 extending well below the bottom edge of the sealing bar is welded or otherwise suitably attached, in thermal contact, and centered on arm 3 to constitute the leading edge of the unit. It is to be understood that the length of the horizontal member of the sealing bar may be varied in accordance with the dwell required for sealing various types of thermoplastic films. Other variables also to be considered are the temperature at which the sealer is to be operated and the speed at which the superimposed films are to be moved through the sealing apparatus. Moreover, the knife may be made integral with the rod simply by sharpening or otherwise shaping the leading edge of arm 3 to form a knife edge. The cutting means may take any form which has a sharpened edge as its leading edge, the cutting edge being capable of slitting superimposed films of various types of thermoplastic materials. It should be pointed out that while, in the preferred embodiment, the cutting means is actually attached to the leading edge of the sealing bar, the cutting means does not have to be heated. Obviously, heat is conducted to the cutting means from the heated bar, but the complete apparatus will operate efficiently when the cutting means is at normal room temperature.

Many types of longitudinal edge seals may be made with the apparatus just described, the type of seal depending upon the position of the apparatus with respect to the plane of the superimposed films. Thus, the following types of longitudinal edge seals may be made with the present apparatus:

1. The "lap" seal, wherein the edges of the superimposed films are folded under, and the seal is strongest at the line of fold. The lap seal is illustrated in Figure 3.

2. A "bead" seal, wherein superimposed films are sealed only along their edges, that is, there is no substantial extension of the seal from the edges of superimposed films. This type of seal is illustrated in Figure 5.

3. A "fin" seal, wherein the sealed areas extend in a short distance from the edges of the superimposed films, that is, the heat penetrates in from the edges to produce a wider seal than that defined as a "bead" seal. The fin seal is illustrated in Figure 7.

4. The "line" seal, wherein the film is slit and thereafter sealed together again, this type of seal being employed to form a tube which is subdivided by longitudinal seals into a multiplicity of individual compartments. This type of seal is illustrated in Figure 9.

5. A "flat" seal, which is made without the use of a knife blade on the apparatus, that is, the seal is made by contacting the upper surface of the superimposed films with the trailing end of the sealing bar to produce a relatively wide flat seal. This type of seal is illustrated in Figure 11.

Since the horizontal portion of the sealing bar lies substantially in the plane of the superimposed lengths of film being slit and sealed, it is important that the bottom of the bar be substantially straight. Hence, as shown in Figures 1, 4, 6, 8 and 10, the type of seal which may be made is determined by the position of the horizontal section of the bar with respect to the horizontal plane in which the superimposed films are moving. It should be pointed out that in Figures 1, 4, 6, 8 and 10, superimposed films are moving in a horizontal plane. On this premise, that is, that the superimposed films are moving in a substantially horizontal plane, the various types of seals described above may be made by positioning the sealing apparatus of this invention in the positions indicated in Figures 1, 4, 6, 8 and 10. The positions indicated in these drawings are entirely accurate for producing the various types of seals (indicated in Figures 3, 5, 7, 9 and 11) in superimposed films of polyethylene. It should be understood that these positions of the sealing apparatus may require some slight variations from the positions illustrated when attempting to effect the same types of seals in other types of thermoplastic films.

Figure 2, in addition to illustrating the preferred cross-sectional configuration of the sealing bar, also shows a stage in the formation of a lap seal. At section 2—2 of Figure 1, the superimposed films have previously been slit; and as the films contact the curved surface of the sealing apparatus, the edges of the superimposed films are guided downward and the cross-sectional area of the superimposed films, which is actually in contact with the surface of the sealing element, is fused; and this area is weakened momentarily, i. e., is melted to such an extent that the lapped edges of the film F and F' are folded under and upon the main body of the film to form a lap seal as illustrated in Figure 3. The shaded areas are areas actually sealed together. This lap seal or seam is of great strength compared with any other type of edge seal, particularly in bag construction intended for packaging heavy produce such as apples, oranges, potatoes, etc. Furthermore, as shown in Figure 3, the heat penetrates to such an extent that the lapped portion of the superimposed films is also sealed along a considerable length of the lapped portion. In general, for producing a lap seal with superimposed thermoplastic films of any type, the sealing apparatus should be positioned so that the trailing edge of the sealing bar is further below the horizontal plane of the films than is the leading edge of the bar.

Figure 4 illustrates positioning the sealing apparatus so that the leading edge thereof is in the horizontal plane of the superimposed films and the trailing edge is completely out of, i. e., above, the horizontal plane containing the superimposed films. When the apparatus is in this position, the type of edge seal formed is a bead seal, and this is illustrated in Figure 5. Such a position, as shown in Figure 4, does not permit the edges of the film to fold under because they are only in contact with the narrow portion of the width of the sealing bar.

A fin seal is produced by permitting the superimposed films to fold under to only a slight degree as the edges of the superimposed films contact the surface of the horizontal portion of the sealing bar. In other words, the edges of the film do not come into contact with the widest portion of the width of the sealing element; and this is accomplished by positioning the apparatus so that the leading and trailing edges thereof are substantially the same distance below the horizontal plane containing the superimposed films. This position is illustrated in Figure 6, and the fin seal is illustrated in Figure 7, which is section 7—7 of Figure 6.

Figure 8 shows the sealing apparatus in the proper position for producing a line seal. In producing a line seal, the superimposed films are slit by the knife blade; and the slit edges of the film do not come into contact with the forward portion of the sealing bar, but are contacted with the trailing edge of the bar which seals the slit superimposed films together again to form what has been defined as a line seal. When tubing having a multiplicity of transversely spaced line seals therein is slit and sealed transversely to form bags, the resulting bags contain a multiplicity of separated pockets. Figure 9 illustrates the line seal.

A flat seal is produced by positioning the sealing apparatus as illustrated in Figure 10. In making this seal, the knife edge is not utilized, and the trailing edge of the sealing bar is the only portion thereof which is in contact with the superimposed films. The flat seal is illustrated in Figure 11, which is section 11—11 of Figure 10.

The sealing apparatus of this invention is most useful when a multiplicity thereof is employed in a manner similar to that shown in Figure 12. As shown in Figure 12, a multiplicity of sealing apparatus are mounted upon a shaft positioned transversely of continuous lengths of superimposed thermoplastic films. The shaft is positioned at such a height as to place the individual sealing apparatus in the proper position for making the type of seal desired. Each sealing apparatus is preferably connected to a separate source of electrical energy so that the temperature of each of the sealing apparatus may be individually controlled. It should be emphasized that the versatility of the present apparatus is further exemplified by the fact that the edges of superimposed lengths of film may be sealed together to form the same type of seal being formed by those apparatus positioned at various intervals transversely of the lengths of film. This is accomplished by permitting the edges of the length of film to come into contact with one sealing surface of the sealing bar, as illustrated by position of the sealing apparatus designated Y and Z in Figure 12. By employing the sealing apparatus in this manner, no trimming of the edges of the lengths of superimposed films is necessary. The relative positions of sealing apparatus in Y and Z, with respect to the horizontal plane in which the superimposed films lie, will be essentially the same as those positions illustrated in Figures 1, 4, 6, 8 and 10, this depending upon the type of seal desired. Furthermore, in sealing the extreme edges of lengths of superimposed films, the sealing apparatus is positioned so that the inner surface of the knife blade just touches the edges of the superimposed films; and the trailing edge of the sealing bar is pushed in slightly to insure uniform contact with the edges of the superimposed films.

Figure 13, to be considered along with Figure 12, illustrates an arrangement of supply rolls 20 and 21, tensioning rolls 22—28, pinch rolls 29 and 30, and wind-up rolls 31—34 suitable for superimposing continuous lengths of film and conveying these superimposed films through a plurality of the present cutting and sealing units and thereafter to suitable wind-up rolls. The essential requirements for any such arrangement are that the edges of the film are even, and that sufficient tension be maintained upon the superimposed films to keep them in close contact during the slitting and sealing step.

The success of forming a lap seal with the present apparatus is influenced by the arrangement employed to maintain tension upon the films after the seal has been formed. In most cases, it is important to position tensioning rolls 24 and 25 of Figure 13 relatively close together. Such close arrangement permits efficient control of the superimposed films passing through the sealing apparatus. Furthermore, roll 25 serves to conduct heat away from the formed seals; and, particularly in the case of the lap seal, the tension applied by roll 25 serves to "iron" the lapped seal into a substantially flattened form. This flattening operation is so efficient that it is usually necessary to employ a sharp pointed instrument such as a pencil point in order to separate layers F and F' of Figure 3. Furthermore, layer L is ironed flatly against the main body of the superimposed films. Additional cooling or quenching of the seals may be effected by blowing air, as shown in Figure 13, onto the seals as the superimposed films pass over and from roll 4.

Figure 14 is the general cross-sectional configuration considered necessary for the sealing bar, this configuration being substantially elliptical. Figure 15 illustrates a sealing element which is oval in cross-section, the term "oval" or "egg-shaped" being embraced by the term "elliptical." The term "elliptical" for the purpose of describing the sealing apparatus of this invention, is meant to include the cross-sectional configuration shown in Figure 16, this being a modified oval; or more specifically, it takes the form of a triangle having rounded corners. In all cases, however, the cross-sectional configuration of the sealing bar of the present invention should be elliptical, and preferably substantially oval in cross-section. As illustrated in Figure 2, the widest portion of the width of the sealing bar should be positioned uppermost.

In continuously carrying out the slitting and sealing of superimposed films of various thermoplastic polymers with the sealing apparatus of the present invention, the superimposed films being conveyed in accordance with the arrangement shown in Figure 13, it should be pointed out that a number of important variables must be considered in determining the conditions of optimum efficiency. The variables involved include type of thermoplastic film, e. g., stiffness, thickness of the film, temperature of sealing, rate of movement of the film through the sealing apparatus, and type of seal desired. In general, as long as the rate of sealing is not excessive, the sealing apparatus may be employed to effect efficient seals by maintaining the apparatus at the melting point of the thermoplastic film. On the other hand, efficient sealing may be carried out at any temperature; that is, the sealing apparatus may be maintained at any temperature above the melting point of the thermoplastic film.

The ultimate temperature of operation will generally depend upon the rate at which sealing is to be carried out, and this usually depends upon the type of winding equipment being employed and the practicability of operation at excessively high speeds. The data presented in Table I illustrate sealing thermoplastic films with the present apparatus at rates ranging from 35 to 210 feet per minute and at temperatures ranging from 50° C. above the melting point to temperatures of about 240° C. above the melting point of the thermoplastic films. As a general observation from the test data relating to the seal strengths of the various types of seals effected at various temperatures, the highest seal strength values appear to be attained when the films are sealed at temperatures somewhere intermediate between 50° and 240° C. above the melting point of the polymeric films.

The data recorded in Table I were obtained by employing an apparatus set up in accordance with that illustrated in Figure 13. Table I indicates the type of film sealed, the thickness of the film, the rate at which the film moved through the sealing apparatus, the temperature of the surface of the heat-sealing element, the seal strength, and the elongation of the seal or area around the seal at break. The strength of the seal represents an average of five determinations per sample of one inch in width. That is, the superimposed films sealed at one end, the seal width being one inch, were pulled on an Instron electronic tensile tester at an elongation rate of 1200% per minute at 75° F. The value of elongation shown represents the extent to which the test sample elongated at the time of failure of the film due to tearing of the seal or to peeling of the seal.

*Table I*

| Example | Type film | Gauge (mils) | Type seal | Rate of film movement (ft./min.) | Sealing temperature (° C.) | Seal strength (grams) | Elongation at break (percent) |
|---|---|---|---|---|---|---|---|
| 1 | Polyethylene | 0.91 | Lap | 100 | 166 | 544 | 396 |
| 2 | do | 0.94 | Lap | 100 | 138 | 499 | 484 |
| 3 | do | 0.95 | Lap | 100 | 210 | 736 | 607 |
| 4 | do | 0.91 | Lap | 100 | 271 | 585 | 377 |
| 5 | do | 0.91 | Lap | 210 | 149 | 494 | 398 |
| 6 | do | 0.88 | Lap | 210 | 260 | 565 | 442 |
| 7 | do | 0.92 | Lap | 210 | 343 | 584 | 560 |
| 8 | do | 0.91 | Lap | 37 | 116 | 588 | 567 |
| 9 | do | 0.98 | Lap | 37 | 188 | 628 | 569 |
| 10 | do | 0.92 | Lap | 37 | 249 | 617 | 556 |
| 11 | do | 0.95 | Lap | 37 | 149 | 622 | 555 |
| 12 | do | 1.45 | Lap | 35 | 143 | 1,066 | 502 |
| 13 | do | 1.49 | Lap | 35 | 190 | 1,033 | 594 |
| 14 | do | 1.46 | Lap | 35 | 232 | 1,242 | 640 |
| 15 | do | 0.89 | Bead | 35 | 138 | 538 | 537 |
| 16 | do | 0.85 | Bead | 35 | 171 | 437 | 288 |
| 17 | do | 0.85 | Bead | 35 | 193 | 563 | 583 |
| 18 | do | 1.87 | Lap | 35 | 143 | 1,253 | 375 |
| 19 | do | 1.80 | Lap | 35 | 193 | 1,373 | 531 |
| 20 | do | 1.87 | Lap | 35 | 254 | 1,413 | 495 |
| 21 | do | 1.71 | Lap | 35 | 166 | 1,208 | 452 |
| 22 | Cellulose acetate | 1.10 | Flat | 35 | 149 | 294 | 8 |
| 23 | Polyethylene | 2.78 | Lap | 35 | 168 | 1,550 | 55 |
| 24 | do | 2.75 | Lap | 35 | 200 | 1,918 | 488 |
| 25 | do | 2.73 | Lap | 35 | 243 | 1,721 | 328 |
| 26 | do | 2.75 | Lap | 35 | 205–315 | 1,736 | 378 |
| 27 | do | 3.88 | Lap | 35 | 304 | 2,012 | 374 |
| 28 | do | 0.94 | Flat | 35 |  | 521 | 602 |
| 29 | do | 0.90 | Bead | 35 |  | 552 | 613 |
| 30 | do | 0.89 | Flat | 35 | 171 | 504 | 448 |
| 31 | do | 0.88 | Flat | 35 | 246 | 539 | 544 |
| 32 | do | 0.86 | Flat | 35 | 304 | 563 | 595 |
| 33 | do | 0.89 | Fin | 35 | 138 | 553 | 665 |
| 34 | do | 0.89 | Fin | 35 | 191 | 517 | 500 |
| 35 | do | 0.86 | Fin | 35 | 249 | 543 | 542 |
| 36 [1] | Polyethylene terephthalate | 2.12 | Bead | 35 | 246 | 4,339 | 151 |
| 37 [1] | do | 2.10 | Bead | 35 | 246 | 6,832 | 369 |
| 38 | Rubber hydrochloride | 0.73 | Lap | 35 | 113 | 1,116 | 71 |
| 39 | do | 0.78 | Lap | 35 | 104 | 1,256 | 284 |
| 40 | do | 0.86 | Lap | 35 | 121 | 1,355 | 172 |
| 41 | do | 0.87 | Lap | 35 | 149 | 1,677 | 159 |
| 42 | Polyvinylidene chloride | 1.56 | Flat | 35 | 149 | 3,749 | 19 |
| 43 | Polyvinyl chloride | 2.23 | Lap | 35 | 221 | 2,362 | 116 |
| 44 | do | 2.37 | Lap | 35 | 254 | 2,174 | 88 |
| 45 | do | 2.34 | Lap | 35 | 299 | 2,739 | 161 |
| 46 | do | 1.39 | Lap | 35 | 232 | 2,140 | 188 |
| 47 | do | 1.44 | Lap | 35 | 304 | 2,364 | 227 |
| 48 [2] | Polyethylene terephthalate | 2.35 | Bead | 35 | 310 | 2,541 | 81 |

[1] Polyethylene terephthalate film (oriented in a direction perpendicular to seal).
[2] Polyethylene terephthalate film (oriented in 2 directions and heat-set).

The present apparatus may be employed for sealing or slitting and sealing simultaneously superimposed webs of thermoplastic films which may be heat-sealed by conventional apparatus. Included among such films are those of polyethylene, chlorinated polyethylene, chlorosulfonated polyethylene, various polyamides such as polyhexamethylene adipamide, polycaproamide, polyesters such as polyethylene terephthalate, polyvinylidene chloride, rubber hydrochloride, cellulose acetate, cellulose nitrate, ethyl cellulose, polyvinyl chloride, and copolymers of vinyl chloride and vinyl acetate. It should be emphasized that oriented or unoriented films may be sealed successfully with the present apparatus.

The versatility of the present apparatus with respect to effecting various types of seals has been clearly illustrated in the accompanying drawings. The relative positions of the apparatus for effecting the various types of seals are substantially correct for sealing superimposed films of polyethylene film. On the other hand, with stiffer films or with films of greater thickness, it may be necessary to modify the indicated positions slightly to obtain exactly the type of seal desired.

An advantage of the present apparatus over all other types of hot knife or blade sealing apparatus is that the cross-sectional configuration of the sealing bar provides for intimate contact between the edges of the superimposed films and the horizontal section of the bar; and, consequently, the resulting seals are uniform and flawless. In other words, after the superimposed films are slit by the cutting edge of the present apparatus, the width of the sealing bar (generally not less than 1/4") is such as to "obstruct" the straight passage of the slit edges of the films; and in order to move past the sealing apparatus, the edges of the slit films are actually forced into intimate contact with the horizontal section of the hot sealing bar, the amount of contact depending upon the type of seal desired.

As an outstanding advantage of the present apparatus, it should be emphasized that the formation of a lap seal, as illustrated in Figure 3, has never been successfully accomplished in any type of hot knife slitting-sealing apparatus known heretofore. In practical tests of a bag having longitudinal lap seals and a transverse flat seal, the lap seal, as shown in Figure 3, has been proven to be vastly superior for packaging such heavy items as potatoes, apples and oranges over other types of longitudinal edge seals, such as the bead seal shown in Figure 5. In other words, the longitudinal lap seal is highly superior to the longitudinal bead seals and fin seals in packaging applications wherein a very slow elongating pressure is impressed upon the seams of a bag containing heavy articles such as potatoes, apples and oranges. The superior strength of the lap seal at slow elongation rates is derived from the fact that the edges are actually reinforced because a greater area is sealed and the greatest strength is at the line of fold of the overlap. Furthermore, the folded edges are sealed together along an area extended almost to the edges of the folded portion. Figure 3 illustrates the extension of the sealed area beyond the sealed line along which the film is folded.

We claim:

1. A heat-sealing device for heat-sealing thermoplastic webs comprising, in combination, a bar comprising an elongated, substantially straight, horizontal section and an upwardly projecting arm at each end thereof, said horizontal section being so formed in cross-section as to present two oppositely disposed heat-sealing surfaces, said surfaces meeting in a line below and parallel to the longitudinal axis of said horizontal section and on the vertical axis thereof, and means for heating said bar to heat-sealing temperatures.

2. The device of claim 1 wherein said heating means is electrical heating means.

3. A heat-sealing device for heat-sealing thermoplastic webs comprising, in combination, a bar comprising an elongated, substantially straight, horizontal section and an upwardly projecting arm at each end thereof, one of said arms constituting the leading edge of said bar, said horizontal section being so formed in cross-section as to present two oppositely disposed heat-sealing surfaces, said surfaces meeting in a line below and parallel to the longitudinal axis of said horizontal section and on the vertical axis thereof, means for heating said bar, and web-cutting means positioned immediately adjacent said leading edge and in thermal contact therewith.

4. The device of claim 3 wherein said heating means is electrical heating means.

5. A heat-sealing device for heat-sealing thermoplastic webs comprising, in combination, a bar comprising an elongated, substantially straight, horizontal section terminating at each end in a vertical arm, said horizontal section having an elliptical cross-section, the major axis of the ellipse corresponding to the vertical axis of said horizontal section, the widest portion of the horizontal section being positioned uppermost, and electrical means for heating said bar to heat-sealing temperatures.

6. A heat-sealing device for heat-sealing thermoplastic webs comprising, in combination, a bar comprising an elongated, substantially straight, horizontal section terminating at each end in a vertical arm, one of said arms constituting the leading edge of the bar, said horizontal section having an elliptical cross-section, the major axis of the ellipse corresponding to the vertical axis of said horizontal section, the widest portion of the horizontal section being positioned uppermost, web-cutting means attached at the leading edge of said bar and in thermal contact therewith, and electrical means for heating said bar and said web-cutting means.

7. The device of claim 6 wherein the web-cutting means comprises a knife blade, the cutting edge of which extends substantially below the bar.

References Cited in the file of this patent

UNITED STATES PATENTS

| 2,516,602 | Snyder | July 25, 1950 |
| 2,535,029 | Atanasoff et al. | Dec. 26, 1950 |
| 2,556,452 | Spalding | June 12, 1951 |
| 2,627,213 | Nye | Feb. 3, 1953 |
| 2,665,738 | Caskin | Jan. 12, 1954 |
| 2,712,343 | Stanton | July 5, 1955 |